United States Patent
Fogal, Sr. et al.

(10) Patent No.: US 7,192,096 B2
(45) Date of Patent: *Mar. 20, 2007

(54) BALANCE WEIGHT CARTRIDGE WITH ENCLOSED BALANCE MEDIA

(76) Inventors: Robert D. Fogal, Sr., 15 Kenwood Rd., Chambersburg, PA (US) 17201; Robert D. Fogal, Jr., 99 Springfield Rd., Newville, PA (US) 17241

(*) Notice: Subject to any disclaimer, the term of this patent is extended or adjusted under 35 U.S.C. 154(b) by 0 days.

This patent is subject to a terminal disclaimer.

(21) Appl. No.: 11/306,397

(22) Filed: Dec. 27, 2005

(65) Prior Publication Data

US 2006/0197368 A1  Sep. 7, 2006

Related U.S. Application Data

(63) Continuation of application No. 10/806,671, filed on Mar. 23, 2004, now Pat. No. 6,979,060.

(60) Provisional application No. 60/488,634, filed on Jul. 18, 2003.

(51) Int. Cl.
*F15F 15/22* (2006.01)
(52) U.S. Cl. ............... 301/5.22; 301/5.21; 74/573.1
(58) Field of Classification Search ............ 301/5.21, 301/5.22; 74/573 F, 573.1; 152/154.1; 73/460
See application file for complete search history.

(56) References Cited

U.S. PATENT DOCUMENTS

| | | |
|---|---|---|
| 2,687,918 A | 8/1954 | Bell et al. |
| 2,737,420 A | 3/1956 | Wilborn |
| 3,006,690 A | 10/1961 | Pierce |
| RE25,383 E | 5/1963 | Morrill |
| 3,166,356 A | 1/1965 | Sutherland et al. |
| 3,316,021 A | 4/1967 | Salathiel |
| 3,346,303 A | 10/1967 | Wesley |
| 3,462,198 A | 8/1969 | Onufer |
| 3,464,738 A | 9/1969 | Pierce |
| 3,724,904 A | 4/1973 | Nixon et al. |
| 3,913,980 A | 10/1975 | Cobb, Jr. |
| 3,953,074 A | 4/1976 | Cox |
| 4,269,451 A | 5/1981 | Narang |
| 5,048,367 A | 9/1991 | Knowles |
| 5,503,464 A | 4/1996 | Collura |
| 6,267,450 B1 * | 7/2001 | Gamble ............ 301/5.22 |
| 6,581,658 B2 | 6/2003 | Nakajima et al. |
| 6,719,374 B2 | 4/2004 | Johnson |
| 6,979,060 B2 | 12/2005 | Fogal, Sr. et al. |

* cited by examiner

*Primary Examiner*—Russell D. Stormer
(74) *Attorney, Agent, or Firm*—Hahn Loeser & Parks, LLP; Robert J. Clark

(57) ABSTRACT

A weight comprising a cartridge having at least one interior chamber, the interior chamber at least partially filled with a flowable balance media, and wherein the cartridge is longitudinally arcuate, at least when attached to a wheel, about an angle of up to 180 degrees or less. The weight provides a balanced tire in the new or just balanced condition and helps retain the balance under changes in at least one operational characteristic of the tire/wheel assembly.

12 Claims, 5 Drawing Sheets

BALANCE WEIGHT CARTRIDGE WITH ENCLOSED BALANCE MEDIA

This application is a continuation of U.S. non-provisional patent application Ser. No. 10/806,671, filed Mar. 23, 2004, now U.S. Pat. No. 6,979,060, which claims the benefit of U.S. provisional patent application Ser. No. 60/488,634, filed Jul. 18, 2003, both applications hereby incorporated by reference.

TECHNICAL FIELD

This invention relates to a balance weight for dynamically balancing a tire/wheel assembly of a motor vehicle, and more particularly to a balance weight cartridge having an interior chamber at least partially filled with a flowable media which allows for superior balancing under different speeds and changing tire properties.

BACKGROUND OF THE INVENTION

It is standard practice to reduce adverse vibrational effects by balancing the wheel rim and tire assembly by using a balance machine and clip-on lead weights or lead tape weights. The lead balance weights are placed on the rim flange of the wheel and clamped in place in a proper position, or adhered to the wheel in the case of tape weights, as directed by the balancing machine. In general terms, balance is the uniform distribution of mass about an axis of rotation, where the center of gravity is in the same location as the center of rotation. A balanced tire/wheel assembly is one where mass of the tire/wheel assembly mounted on the vehicle's axle-is uniformly distributed around the axle. There are generally two types of balancing, single plane balancing and dual plane balancing. Single plane balancing uses a single weight plane and only addresses "up-and-down" imbalance. Dual plane balancing uses two weight planes and thus eliminates "up-and-down" and "side-to-side" imbalance.

While lead weight balancing has been generally effective, there are several problems associated with their use. Primarily, the standard wheel weights are manufactured from a lead material that has been identified as having a hazardous influence on the environment. Various national and multi-national regulating agencies have passed rules restricting the use of lead balance weights in the future. Balance weights that are not properly secured may fall off during use—resulting in an unbalanced tire. A further disadvantage is that the standard clip on balance weight is difficult to attach to many of the newer wheels which have a reduced wheel flange and are too aesthetically unpleasing to be used on the flanges of fancy alloy wheels. In addition, once the balance weight is in position, regardless of whether a clip-on or tape weight, you can no longer adjust to slight to moderate changes in the proper balance location caused by changing tire/wheel assembly operational characteristics, i.e. tire wear, different speeds, changes in loads which change the loaded radius of the tire, etc.

Attempts to overcome some of these difficulties in truck tires and wheels have resulted in the development of automatic balancing rings comprising a 360 degree annular tube filled with weights in combination with a damping fluid. The tubes are typically attached adjacent the wheel flange. However, these devices tend to cause out of balance problems at lower speeds until the weights are properly positioned. In addition, the balancing rings prevent the attachment of wheel covers or detract from the aesthetics of newer alloy wheels.

The standard wheel balancing systems described above have various disadvantages. It would therefore be an advantage to combine the features of the fixed balance weights in a no-lead configuration in a manner that was able to adjust to operational changes in the tire/wheel assembly without the problems associated with balance rings, in a simple and effective manner.

SUMMARY OF THE INVENTION

It is therefore an object of the present invention to provide a balance weight that will result in a balanced tire in the new or just balanced condition and to retain the balance under changes in at least one operational characteristic of the tire/wheel assembly. These and other aspects and objects of the invention are provided by a balance weight comprising a cartridge having an interior chamber at least partially filled with a flowable balance media, wherein the cartridge is longitudinally arcuate, at least when attached to a tire or wheel, about an angle of up to 180 degrees or less.

These and other aspects and objects of the invention are also provided by a method of balancing a tire/wheel assembly comprising the steps of providing a tire and a wheel; checking the balance condition of the tire and wheel; providing at least one balance weight comprising a cartridge comprising an interior chamber at least partially filled with a flowable balance media, wherein the cartridge is longitudinally arcuate, at least when attached to a wheel or a tire, about an angle of up to 180 degrees or less; and attaching the at least one balance weight to one of the tire and wheel such that when the tire is mounted on the wheel, the assembled tire and wheel are balanced.

BRIEF DESCRIPTION OF THE DRAWINGS

This invention will now be described in further detail with reference to the accompanying drawings, in which.

DESCRIPTION OF THE PREFERRED EMBODIMENT

Figure 1:
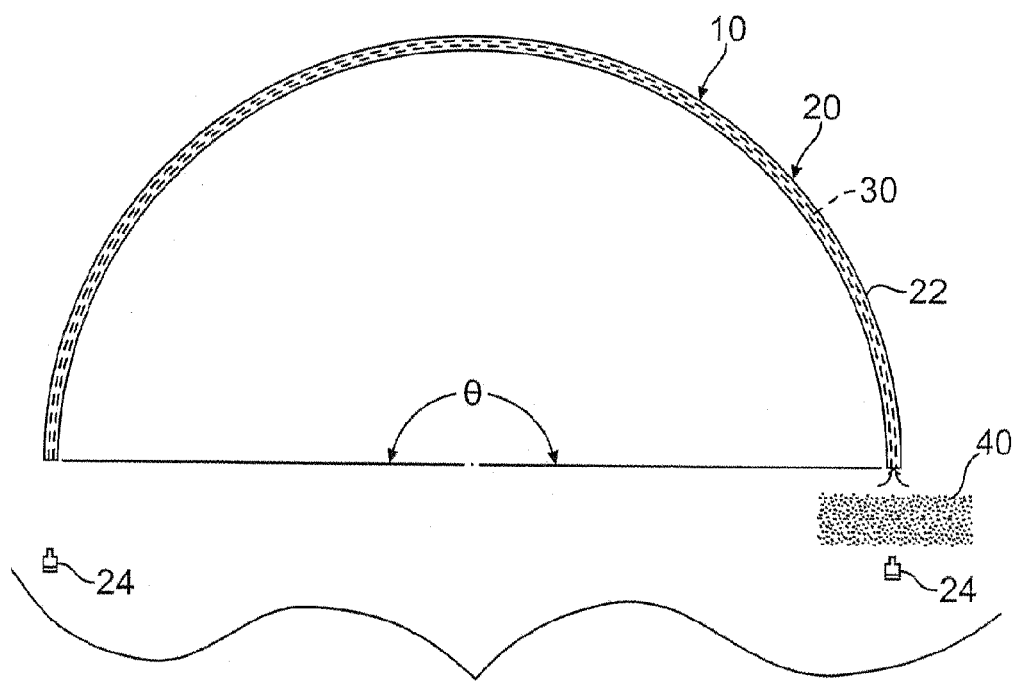
FIG. 1 is an exploded side view of the balance weight of the present invention.
Figure 2:
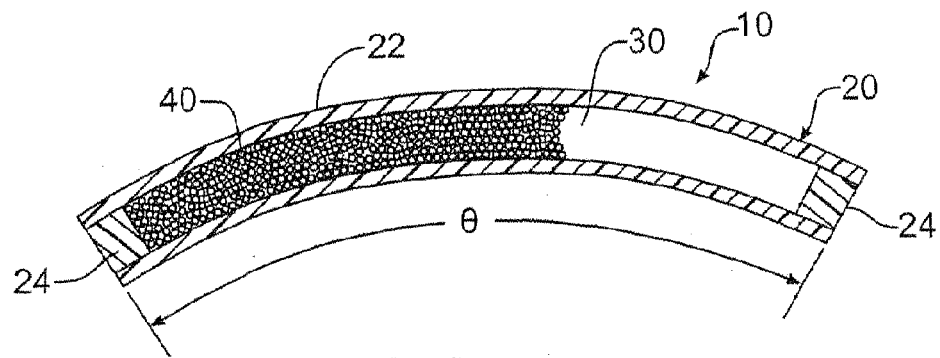
FIG. 2 is a longitudinal cross-sectional view of an assembled balance weight of the present invention.

This invention will now be described in detail with reference to various embodiments thereof. Referring now to FIGS. 1 and 2, an exploded view and an assembled cross-sectional view, respectively, a first embodiment of the present invention is shown as a balance weight 10 comprising a hollow body or cartridge 20 having a interior chamber 30 at least partially filled with a flowable media 40.

The cartridge 20 forms a container and is typically made of a molded or extruded rubber or plastic material that will not react with the metallic surface of a wheel, however the cartridge 20 is not intended to be limited to such materials and any suitable material such as a fabricated aluminum cartridge is also contemplated. The cartridge 20 comprises a tube 22 that may be cut or molded to the desired length. The flowable media 40 is inserted in the tube 22 which is then sealed, most commonly with at least one plug 24 or a heat weld seal may also be used. The cartridge 20 may be formed in a rigid longitudinally arcuate section of an angle θ equivalent to an angle of one hundred eighty degrees or less, or it may be formed in a flexible straight section and positioned into an arcuate section of one hundred eighty degrees or less when attached to a wheel as described in greater detail below. The walls of the tube 22 which make up the interior chamber 30 should be of a smooth surface finish that will promote flow of the flowable media 40.

Figure 3A:
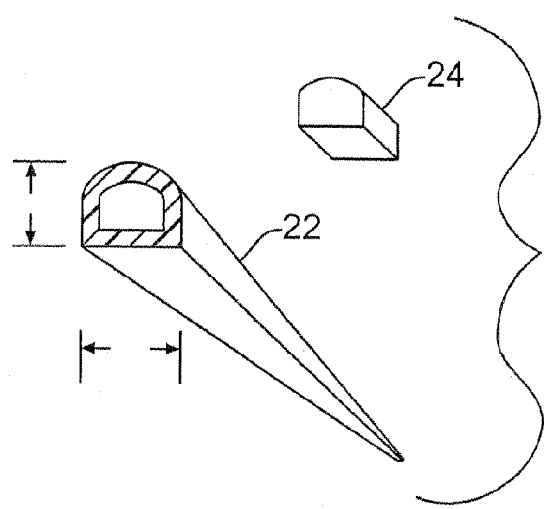
FIGS. 3A–3C are various perspective views of the cartridge of the present invention showing the cross sectional end of the tube and associated plugs of the present invention.
Figure 3B:
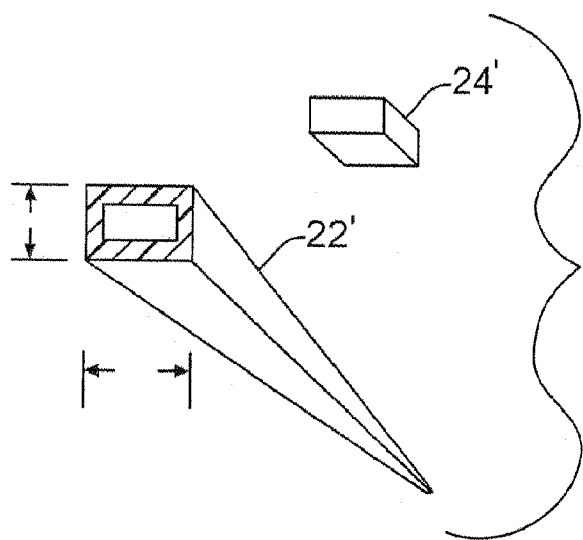
Figure 3C:
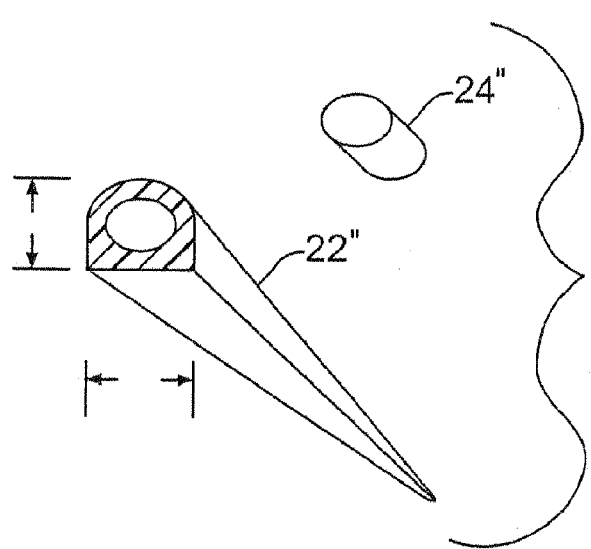

Some possible variations of the tube 22 used for the cartridge 20 are shown in FIGS. 3A–3C, wherein the cross-section of the tube 22 may be shaped as a "D" and corresponding plug 24 as shown in FIG. 3A or tube 22' may be shaped as a rectangle and corresponding plug 24' as shown in FIG. 3B. Alternatively, the interior chamber 30 of the tube 22" may have an oval cross-section and corresponding plug 24" as shown in FIG. 3C. These embodiments are provided as examples only and are not intended to limit the scope of the invention to the particular examples shown herein. It is contemplated that any suitable cross-sectional shape may be used for the tube 22 and interior chamber 30 that does not inhibit the flow of the flowable material 40. It is also contemplated that the physical exterior dimension or height of the tube does not interfere with other systems positioned near the tire/wheel assembly such as the braking system, etc.

Figure 4:
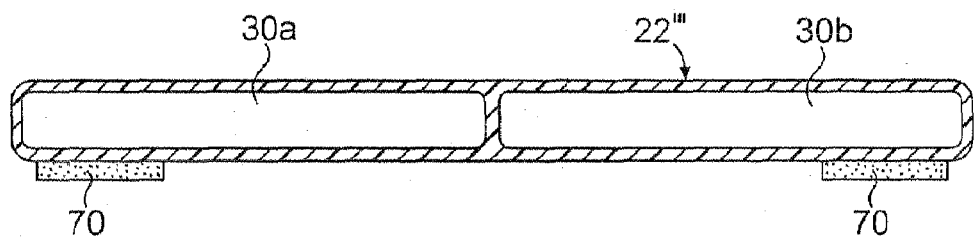
FIG. 4 is a cross-sectional view of another embodiment of the present invention showing a low profile, multi-chamber configuration having adhesive attachment strips.

Another variation of tube is shown in FIG. 4. Tube 22''' employs a low-profile configuration which enables the tube 22''' to be positioned on the inboard side of the wheel without contacting the brake components. Tube 22''' also provides a relatively large chamber cross-sectional area to enable a larger amount of balance media to be used and to allow movement of the media in both a circumferential direction as well as a lateral direction to better balance the wheel in two planes. Adhesive strips 70 are provided on the exterior of tube 22''' to provide means for attaching the tube to the wheel. Tube 22''' may also have more than one chamber 30 as shown in FIG. 4 and designated as 30a and 30b. The multiple chambers 30a, 30b will help provide structural rigidity of the chambers 30a, 30b by providing an interior wall to support the relatively long cross-sectional width or span of tube 22'''. The incorporation of multiple chambers will also limit the lateral movement of the media between chambers 30a, 30b which in some instances may help the media to better balance the wheel by preventing all of the media from migrating to one side of the tube 22''' when the wheel well is formed at an angle to the ground.

The flowable material 40 may be metallic balls as best shown in FIGS. 1, 2, 5 and 6, preferably stainless-steel, however any suitable flowable material is contemplated by the present invention including beads, shot, particles, powders, etc. made of ferrous and non-ferrous metals, ceramics, plastics, glass beads, alumina, etc. It is also contemplated that the flowable material may be a liquid, in whole or in part. Such suitable materials include any material that is stable and remains free flowing over all operating conditions of the tire/wheel assembly. The size of the individual material of the flowable material 40 must be small enough that it can flow in an interior chamber 30 having a relatively small height. Although not shown, it is contemplated that the flowable material may include an optional lubricating agent such as talc or graphite which may help the material enhance and/or retain its flowable characteristics.

The amount of flowable material 40 within the balance weight 10 should be sufficient to enable the balance weight 10 to balance the tire/wheel assembly. In use, the balance weight 10 is preferably applied in the same manner as a standard lead balance weight using a spin balance machine. The tire/wheel assembly is mounted on the spin balancer and the out of balance condition is detected. The spin balancer recommends an amount of weight to be positioned at a particular circumferential position and at a particular predetermined distance from the axis in one or more predetermined planes. When using balance weight 10 of the present invention, the total weight of the balance weight 10 (including the cartridge 20 and flowable material 40) should be equivalent to the amount of weight called for by the balance machine. Therefore the arc length of the cartridge 20 and the amount of flowable media 40 will be proportional to the specified weight with larger imbalances requiring a larger cartridge arc length and more flowable media 40, and vise versa. It is generally contemplated that the amount of flowable material 40 used in a cartridge 20 will vary between 5 to 95 percent of the volume of the internal chamber 30. In one embodiment of the invention, the amount of flowable material 40 as shown is approximately two-thirds of the volume of the internal chamber 30, which has been shown to provide optimized dynamic balancing during current testing, however any amount sufficient to allow the flowable material to sufficiently move and balance the tire/wheel assembly is contemplated. In some applications where the lead balance weight is merely replaced, the entire volume of the interior chamber can be filled with material 40 such that the balance weight 10 acts as a fixed weight.

The prior art lead balance weights are fixed in position by an operator as directed by the spin balance machine. The lead balance weights may be attached to the wheel slightly off position by the operator. This requires the operator to rebalance. Additionally, once the tire/wheel assembly is in operation on the vehicle, tire wear, pot holes, etc. will cause the tire/wheel assembly to go out of balance. In contrast, the balance weight 10 of the present invention allows the weight of the flowable media 40 to move circumferentially as well as laterally within the cartridge 20. The operator attempts to center the balance weight 10 of the present invention at the location specified by the spin balance machine. If the operator misses the exact location slightly, the flowable media 40 is able to adjust the effective balance location of the tire/wheel assembly by moving within the cartridge 20 to obtain a balance equilibrium. Accordingly, the balance weight operator need not be as accurate, and the tire/wheel assembly stays in balance even during operation of the tire/wheel assembly as the balance location moves along the wheel. It is also contemplated that more than one balance weight 10 may be used in the present invention—just as with the prior art lead balance weights.

Figure 5:
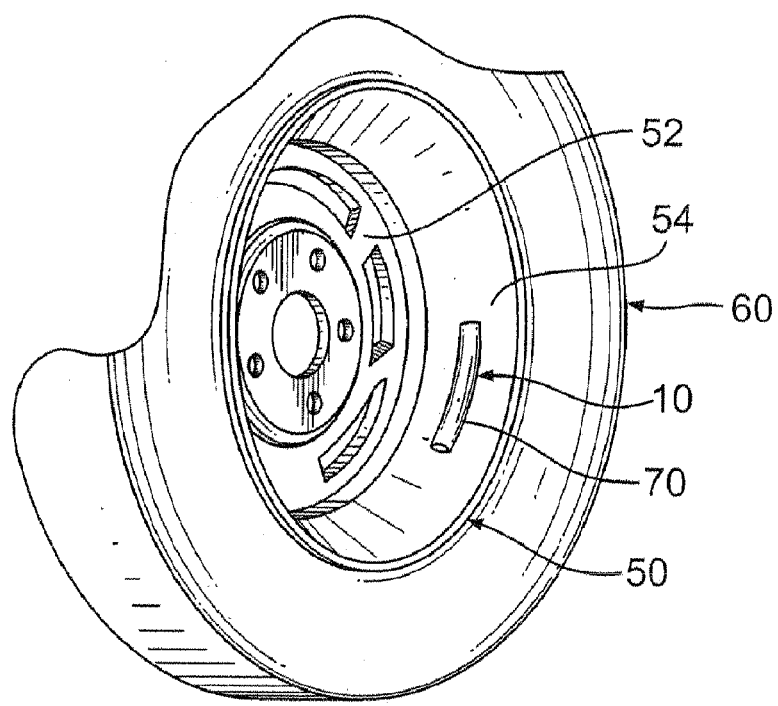
FIG. 5 is a perspective view of an embodiment of the present invention attached to the brake side of the tube well of a tire/wheel assembly.

Referring now to FIG. 5, an embodiment of the balance weight 10 is shown attached to a wheel 50 of a tire/wheel assembly 60 by an adhesive 70. As previously mentioned, the trend toward the more aesthetic aluminum alloy wheels makes it important that the weight is not visible. Accordingly, one possible placement is that the weight 10 may be attached on the inboard side of the spider 52 along the brake side of the tube well 54 of the wheel 50. The weight 10 may be attached to the tube well 54 using an adhesive 70 similar to that used by tape weights. As used in this embodiment, the balance weights 10 are preferably pre-manufactured to different lengths, or arc lengths, of varying total weights. The balance weight 10 is applied in the same manner as are the tape weights as instructed by the particular balance weight machine (not shown). When attaching weights to the brake side of the tube well 54, some operators will often use single plane balancing using the tire/wheel assembly centerline as "good enough", however most newer balancing machines can still utilize dual plane balancing by providing dual planes along the surface of the brake side of the tube well 54. Direct measure balance weight placement and 360 degree weight placement display capabilities make positioning balance weight 10 both simple and accurate to balance the tire/wheel assembly 60.

Figure 6:
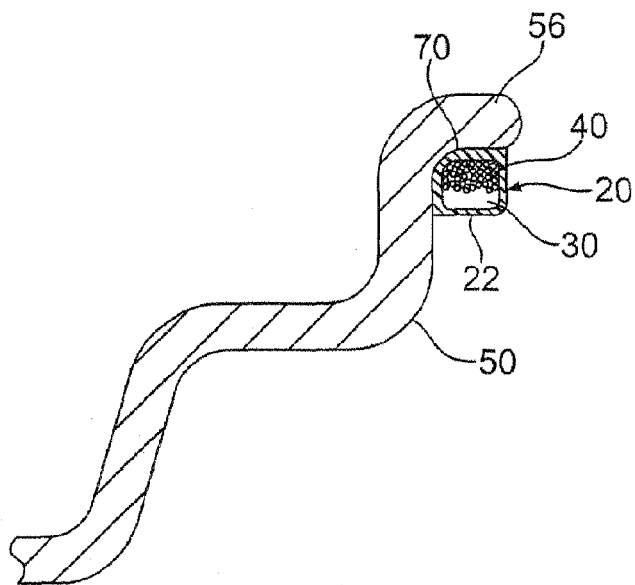
FIG. 6 is a cross-sectional view of an embodiment of the present invention attached to the flange of a tire/wheel assembly.

Referring now to FIG. 6, an embodiment of the balance weight 10 is shown attached to an inboard side flange 56 of the wheel 50 of the tire/wheel assembly (not shown) by an adhesive 70. The cartridge 20 is shown having physical dimensions which corresponds to that of the mating surface of the flange 56. In this manner, the balance weight 10 is positioned similar to that of the prior art balancing rings, except that the balance weight has a limited arc length that enables faster balancing and prevents a severe out of balance condition at slower speeds as is inherent with the prior art balancing rings.

Figure 7:
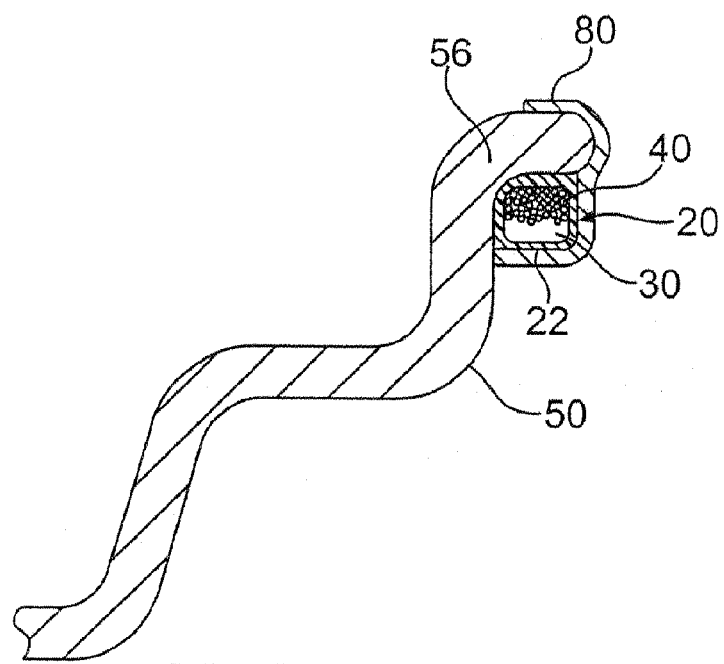
FIG. 7 is a cross-sectional view of a clip-on embodiment of the present invention shown attached to the flange of a tire/wheel assembly.

Referring now to FIG. 7, an embodiment of the balance weight 10 is shown attached to an inboard side flange 56 of the wheel 50 by a clip 80. The clip 80 is formed similar to the standard prior art lead balance weight clips and attaches balance weight 10 to a flange 56 of the wheel 50.

While the balance weight 10 is typically used on the wheel of an assembled tire and wheel, the balance weight can also be used prior to assembly of the tire and wheel. In this method the tire and wheel are individually balanced typically using a bubble balancer and the two are balance matched for minimizing imbalance. The balance weight is then attached to the wheel or the tire. This method is particularly useful when attaching the balance weight to the innerliner of the tire or the pressure side of the wheel tubewell.

Another variation of this balancing method involves the use of a plurality of balance weights 10 positioned adjacent to each, and end to end, about either the wheel or tire such that the entire 360 degree circumference of the wheel or tire is covered by the plurality of balance weights 10. For example, two generally 180 degree balance weights would be positioned in a radial plane circumferentially about the tire or wheel and the two balance weights 10 would work together to counter any imbalance.

Another benefit of the present invention is that the flowable media 40 in the balance weight 10 has the ability to help dampen minor vibration of the tire/wheel assembly due to various causes such as tire uniformity problems. This helps promote a smoother ride for the occupants of the vehicle.

It is also contemplated that balance weight 10 could be mounted on the interior or tire side of the tube well. However, this placement will require knowledge of the heavy spot location of the wheel 50 and tire 60 such that the balance weight 10 will be properly positioned in a location to compensate the imbalance of the assembled and inflated tire/wheel assembly.

Figure 8:
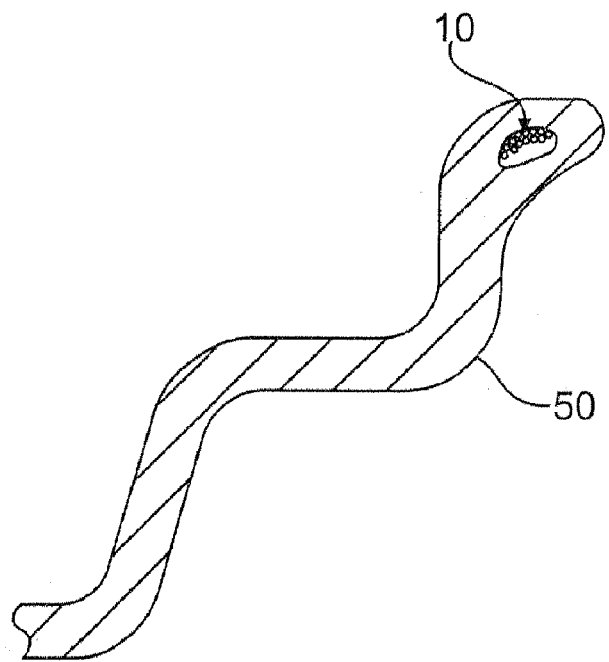
FIG. 8 is a cross-sectional view of an embodiment of the present invention formed integral to a wheel.
Figure 9:
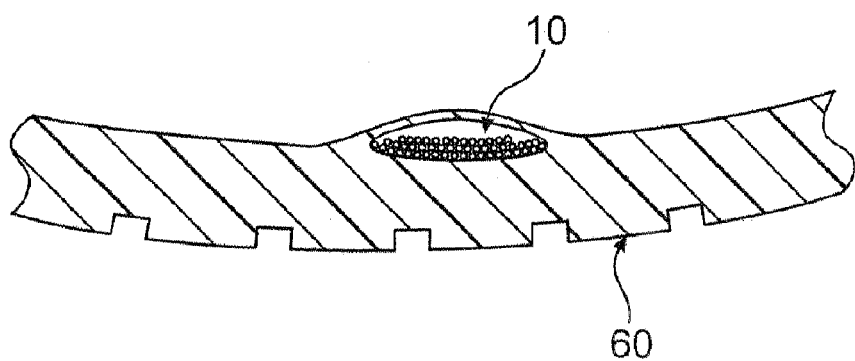
FIG. 9 is a cross-sectional view of an embodiment of the present invention formed integral to a tire.

Other applications of the cartridge style balance weight include a version that is fabricated directly into the tire 60 or wheel 50 as best shown in FIGS. 8 and 9. In this instance, the cartridge 10 may be formed as a cavity in the wheel 50 with flowable material captured in the cavity or attached to the wheel 50 during the manufacturing process. The cartridge 10 may also be formed as part of the innerliner of the tire 60, positioned below the innerliner, or directly attached to the innerliner during the manufacturing of the tire 60. The use of the balance weight cartridge 10 in manufacturing is fully contemplated in the present invention and the claims should be construed to include these embodiments without limitation.

While this invention has been described with reference to preferred embodiments thereof, it shall be understood that such description is by way of illustration and not by way of limitation. Accordingly, the scope and content of the present invention are to be defined only by the terms of the appended claims.

What is claimed is:

1. A method of attaching a weight to a tire/wheel assembly comprising the steps of:
    providing a tire/wheel assembly;
    providing a single weight comprising a cartridge comprising an interior chamber at least partially filled with a flowable media; and
    attaching the single weight to a non-pressurized side of a tubewell of the tire/wheel assembly or a non-presurized side of a rim flange of tire/wheel assembley such that the weight extends about an angle of 180 degrees or less about a rotational axis of the tire/wheel assembly.

2. The method of claim 1, wherein the step of attaching the weight to the tire/wheel assembly is accomplished using an adhesive.

3. The method of claim 1, wherein the weight provided further comprises a clip and the step of attaching the weight to the tire/wheel assembly is accomplished using the clip.

4. A method of attaching a plurality of weights to a tire/wheel assembly comprising the steps of:
    providing a tire/wheel assembly;
    providing a plurality of weights, each weight comprising a cartridge comprising an interior chamber at least partially filled with a flowable media; and
    attaching the plurality of weights to a non-pressurized side of a tubewell of the tire/wheel assembly or a non-presurized side of a rim flange of the tire/wheel assembly such that the plurality of weights, in combination, do not extend 360 degrees about the rotational axis of the tire/wheel assembly when the weights are attached to the wheel.

5. The method of claim 4, wherein the step of attaching the plurality of weights to the tire/wheel assembly is accomplished using an adhesive.

6. The method of claim 4, wherein each weight provided further comprises a clip and the step of attaching the plurality of weights to the tire/wheel assembly is accomplished using the clips.

7. A tire/wheel assembly comprising:
    a wheel;
    a tire mounted on the wheel; and
    a plurality of weights attached to a non-presurized portion of the wheel, each weight comprising a cartridge having an interior chamber at least partially filled with a flowable media;
    wherein each weight extends about an angle of 180 degrees or less about the rotational axis of the tire/ wheel assembly;

wherein the plurality of weights, in combination, do not extend 360 degrees about the rotational axis of the tire/wheel assembly when the weights are attached to the wheel.

8. The tire/wheel assembly of claim 7, wherein the plurality of weights are attached to the wheel with an adhesive.

9. The tire/wheel assembly of claim 7, wherein the plurality of weights are attached to the wheel with a clip.

10. A tire/wheel assembly comprising:
a wheel;
a tire mounted on the wheel; and
a single weight attached to a non-pressurized portion of Ore wheel, the weight comprising a cartridge having so interior chamber at least partially filled wit a flowable media;
wherein weight extends about an angle of 180 degrees or less about the rotational axis of the tire/wheel assembly.

11. The tire/wheel assembly claim 10, wherein the weight is attached to the wheel with an adhesive.

12. The tire/wheel assembly of claim 10, wherein the weight further comprises a clip and the weight is attached to wheel with the clip.

* * * * *

UNITED STATES PATENT AND TRADEMARK OFFICE
CERTIFICATE OF CORRECTION

| | |
|---|---|
| PATENT NO. | : 7,192,096 B2 |
| APPLICATION NO. | : 11/306397 |
| DATED | : March 20, 2007 |
| INVENTOR(S) | : Robert D. Fogal, Sr. and Robert D. Fogal, Jr. |

It is certified that error appears in the above-identified patent and that said Letters Patent is hereby corrected as shown below:

In Col. 6, line 28
insert --the--
between the words "of" and "tire".

In Col. 6, line 28
replace "assembley"
with --assembly.--

In Col. 6, line 61
replace "non-presurized"
with --non-pressureized.--

In Col. 8, line 2
replace "Ore"
with --the--.

In Col. 8, line 2
replace "so"
with --an.--

In Col. 8, line 7
insert --of--
before the word "claim"

Signed and Sealed this

Twenty-first Day of August, 2007

JON W. DUDAS
*Director of the United States Patent and Trademark Office*

UNITED STATES PATENT AND TRADEMARK OFFICE
CERTIFICATE OF CORRECTION

PATENT NO.        : 7,192,096 B2
APPLICATION NO.   : 11/306397
DATED             : March 20, 2007
INVENTOR(S)       : Robert D. Fogal, Sr. and Robert D. Fogal, Jr.

Page 1 of 1

It is certified that error appears in the above-identified patent and that said Letters Patent is hereby corrected as shown below:

In Col. 6, line 28
insert --the--
between the words "of" and "tire".

In Col. 6, line 28
replace "assembley"
with --assembly.--

In Col. 6, line 61
replace "non-presurized"
with --non-pressurized.--

In Col. 8, line 2
replace "Ore"
with --the--.

In Col. 8, line 2
replace "so"
with --an.--

In Col. 8, line 7
insert --of--
before the word "claim"

This certificate supersedes Certificate of Correction issued August 21, 2007.

Signed and Sealed this

Thirteenth Day of November, 2007

JON W. DUDAS
*Director of the United States Patent and Trademark Office*